US012168444B2

(12) United States Patent
Udd et al.

(10) Patent No.: US 12,168,444 B2
(45) Date of Patent: Dec. 17, 2024

(54) CONTROL DEVICE, VEHICLE, COMPUTER PROGRAM, COMPUTER READABLE MEDIUM AND METHOD FOR PERFORMING A GEARSHIFT DURING CREEP MODE

(71) Applicant: Scania CV AB, Södertälje (SE)

(72) Inventors: Jonas Udd, Stockholm (SE); Anders Kjell, Ekerö (SE); Sofie Wisén Svanström, Huddinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/038,064

(22) PCT Filed: Nov. 24, 2021

(86) PCT No.: PCT/SE2021/051171
§ 371 (c)(1),
(2) Date: May 22, 2023

(87) PCT Pub. No.: WO2022/131991
PCT Pub. Date: Jun. 23, 2022

(65) Prior Publication Data
US 2023/0406318 A1 Dec. 21, 2023

(30) Foreign Application Priority Data
Dec. 14, 2020 (SE) .................... 2051460-0

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/06* (2013.01); *B60W 10/10* (2013.01);
(Continued)

(58) Field of Classification Search
CPC ...... B60W 10/02; B60W 10/06; B60W 10/10; B60W 30/18063; B60W 30/19;
(Continued)

(56) References Cited

U.S. PATENT DOCUMENTS 2,409,557 A * 10/1946 Gilfillan .............. F16H 61/0211
310/105
2,943,516 A * 7/1960 Herndon ................. F16D 33/00
475/275
(Continued)

FOREIGN PATENT DOCUMENTS

EP 2269882 A2 1/2011
EP 2129942 B1 5/2016

OTHER PUBLICATIONS

Scania CV AB, International Patent Application No. PCT/SE2021/051171, International Preliminary Report on Patentability, Jun. 13, 2023.
(Continued)

*Primary Examiner* — Edwin A Young
(74) *Attorney, Agent, or Firm* — Moore & Van Allen PLLC; W. Kevin Ransom (57) ABSTRACT

A method for, during creep mode, performing gearshift in a vehicle powertrain comprising a combustion engine, a gearbox, and a clutch is provided. The method comprises, in response to a request for gearshift, disconnecting the combustion engine from the gearbox by opening the clutch. The method further comprises, when the combustion engine is disconnected from the gearbox, shifting the gearbox and controlling the speed of the combustion engine to a target speed. Said target speed constitutes a combustion engine speed corresponding a desired combustion engine torque for completing a torque ramp during closing of the clutch. The method further comprises connecting the combustion engine to the gearbox by closing the clutch. A control device
(Continued)

configured to perform the method and a vehicle comprising the control device are also provided.

16 Claims, 3 Drawing Sheets

(51) Int. Cl.
  *B60W 10/06* (2006.01)
  *B60W 10/10* (2012.01)
  *B60W 30/18* (2012.01)
  *B60W 50/10* (2012.01)
  *F16H 63/46* (2006.01)
  *F16H 63/50* (2006.01)
  *F16H 59/36* (2006.01)
(52) U.S. Cl.
  CPC ...... *B60W 30/18063* (2013.01); *B60W 50/10* (2013.01); *F16H 63/46* (2013.01); *F16H 63/502* (2013.01); *B60W 2510/0638* (2013.01); *B60W 2710/0644* (2013.01); *B60W 2710/0666* (2013.01); *F16H 2059/366* (2013.01); *F16H 2306/52* (2013.01); *F16H 2312/06* (2013.01)
(58) Field of Classification Search
  CPC ......... B60W 50/10; B60W 2510/0638; B60W 2710/0644; B60W 2710/0666; F16H 63/46; F16H 63/502; F16H 2059/366; F16H 2306/52; F16H 2312/06
  See application file for complete search history.

(56) References Cited

U.S. PATENT DOCUMENTS

| | | |
|---|---|---|
| 6,113,515 A | 9/2000 | Salecker et al. |
| 2005/0166693 A1 | 8/2005 | Lauri et al. |
| 2013/0296110 A1 | 11/2013 | Shelton et al. |
| 2016/0016580 A1 | 1/2016 | Johri et al. |
| 2018/0162362 A1 | 6/2018 | Cho et al. |
| 2021/0024072 A1* | 1/2021 | Zhao .................. B60W 10/023 |

OTHER PUBLICATIONS

Scania CV AB, International Patent Application No. PCT/SE2021/051171, International Search Report, Jan. 31, 2022.
Scania CV AB, International Patent Application No. PCT/SE2021/051171, Written Opinion, Jan. 31, 2022.

* cited by examiner

CONTROL DEVICE, VEHICLE, COMPUTER PROGRAM, COMPUTER READABLE MEDIUM AND METHOD FOR PERFORMING A GEARSHIFT DURING CREEP MODE

CROSS-REFERENCE TO RELATED APPLICATIONS

This application is a National Stage Patent Application (filed under 35 § U.S.C. 371) of PCT/SE2021/051171, filed Nov. 24, 2021, of the same title, which, in turn claims priority to Swedish Patent Application No. 2051460-0 filed Dec. 14, 2020, of the same title; the contents of each of which are hereby incorporated by reference.

FIELD OF THE INVENTION

The present disclosure relates in general to a method for performing a gearshift in a powertrain of a vehicle during creep mode. The present disclosure further relates to a control device configured to perform a gearshift in a powertrain of a vehicle during creep mode. The present disclosure further relates in general to a computer program and a computer-readable medium. Moreover, the present disclosure relates in general to a vehicle.

BACKGROUND OF THE INVENTION

A vehicle, such as a land-based heavy vehicle, may be operated in a number of different driving modes depending on the circumstances. One such driving mode is the so-called creep mode where the vehicle is travelling without the operation of an accelerator pedal or a vehicle brake. In the creep mode, driving torque is transmitted from the propulsion unit (such as a combustion engine) to the driving wheels of the vehicle while the propulsion unit is operated at a predetermined rotational speed, typically the idle speed. The creep mode may be useful when desiring to travel at an essentially constant, low, vehicle speed. Examples of such situations may be in heavy traffic or when travelling in specific restricted areas, such as loading yards or the like.

In case there is a desire for change of vehicle speed when the vehicle is operated in creep mode, the creep mode either has to be terminated (for example by pressing the accelerator pedal) or the gearbox has to be shifted to a different gear providing another gear ratio. A driver of the vehicle may for example request such a change of gear by pressing a button on a shift lever or the like.

EP 2 129 942 B1 discloses a method for operating a semi-automatic or automatic mechanical transmission of a heavy truck when driving at idle speed. The method comprises supplying fuel to the engine at a rate that facilitates engine-idle operation, engaging the transmission in a gear higher than the starting gear and permitting the heavy vehicle to operate at a first substantially uniform driving velocity under engine-idle power, upshifting the transmission by manual control of a control device for manual gear selection and then driving the vehicle at a second substantially uniform driving velocity (higher than the driving velocity) under engine-idle power. According to the method, the speed of the vehicle is automatically increased before the engine is disconnected from the gearbox, for the purpose of the upshift, controlling the engine. Alternatively, the speed of the vehicle is automatically increased to the new higher speed by the reengagement of the clutch after the gearbox has been shifted.

The latter alternative for increasing the vehicle speed according to the method described in EP 2 129 942 B1 provides a more comfortable but slower gearshift compared to the first alternative where the speed of the vehicle is increased prior to the gearshift. Furthermore, the wear of the clutch is likely increased compared to the first alternative.

SUMMARY OF THE INVENTION

The object of the present invention is to enable a comfortable gearshift in a vehicle powertrain operated in creep mode with reduced risk of wear of the clutch.

The object is achieved by the subject-matter of the appended independent claim(s).

In accordance with the present disclosure, a method for performing a gearshift in a powertrain of a vehicle during creep mode is provided. The method is performed by a control device. The powertrain comprises a combustion engine, a gearbox, and a clutch arranged between the combustion engine and the gearbox. The method comprises, in response to a request for gearshift, disconnecting the combustion engine from the gearbox by opening the clutch. The method further comprises, when the combustion engine is disconnected from the gearbox, shifting the gearbox and controlling the speed of the combustion engine to a target speed. Said target speed constitutes a combustion engine speed corresponding a desired combustion engine torque for completing a torque ramp during closing of the clutch and is equal to or greater than a minimum threshold combustion engine speed. The method further comprises connecting the combustion engine to the gearbox by closing the clutch.

The method according to the present disclosure provides an intelligent and dynamic method for shifting gears during creep mode which results in more comfortable gearshifts and lower wear of the clutch.

More specifically, by controlling the combustion engine to the target speed when the combustion engine is disconnected from the gearbox, the rotational speed of the combustion engine may be tailored to the appropriate speed for slipping the clutch to the closed state. Such a combustion engine speed may in many situations be lower than the idle speed of the engine. Thereby, lower wear of the clutch and increased comfort is achieved since it is possible to more quickly close the clutch compared to a case of closing of the clutch at idle speed.

The above described desired combustion engine torque may comprise the combustion engine torque required to completing the torque ramp during closing of the clutch plus a predetermined torque offset. Thereby, it is ensured that there is a margin in the control of the combustion engine speed such that it may be maintained during closing of the clutch and that the vehicle will reach the desired new travelling speed by the closing of the clutch without risk of the combustion engine stalling. The predetermined torque offset may for example be from 50 Nm to 300 Nm.

The method may further comprise determining the combustion engine speed corresponding to said desired combustion engine torque from a maximum torque curve defining the physical constraints of the combustion engine. Thereby, the target speed may reliably and easily be determined.

The method may further comprise determining a first speed of the combustion engine corresponding to said desired combustion engine torque, and, if said first speed is below the minimum threshold combustion engine speed, setting the target speed to said minimum threshold combustion engine speed. Thereby, it is ensured that the target speed is a speed at which the combustion engine may be safely and controllably operated.

The request for gearshift may constitute a driver-initiated request for gearshift.

The present disclosure further relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Furthermore, the present disclosure provides a control device configured to perform a gearshift in a powertrain of a vehicle during creep mode. The powertrain comprises a combustion engine, a gearbox, and a clutch arranged between the combustion engine and the gearbox. The control device is configured to, in response to a request for gearshift, disconnect the combustion engine from the gearbox by opening the clutch. The control device is further configured to, when the combustion engine is disconnected from the gearbox, shift the gearbox and control the speed of the combustion engine to a target speed, said target speed constituting a combustion engine speed corresponding to a desired combustion engine torque for completing a torque ramp during closing of the clutch and being equal to or greater than a minimum threshold combustion engine speed. The control device is further configured to connect the combustion engine to the gearbox by closing the clutch.

The control device provides the same advantages as described above for the corresponding method for performing a gearshift in a powertrain of a vehicle during creep mode.

Said desired combustion engine torque may comprise combustion engine torque required for completing the torque ramp during closing of the clutch plus a predetermined torque offset. The predetermined torque offset may for example be from 50 Nm to 300 Nm.

The control device may further be configured to determine the combustion engine speed corresponding to said desired combustion engine torque from a maximum torque curve defining the physical constraints of the combustion engine.

The control may further be configured to determine a first speed of the combustion engine corresponding to said desired combustion engine torque, and if said first speed is below the minimum threshold combustion engine speed, set the target speed to said minimum threshold combustion engine speed.

The request for gearshift, in response to which the control device is configured to disconnect the combustion engine from the gearbox, may constitute a driver-initiated request for gearshift.

The present disclosure further relates to a vehicle comprising the above described control device. The vehicle may further comprise a vehicle powertrain comprising a combustion engine, a gearbox and a clutch arranged between the combustion engine and the gearbox. The vehicle may be a heavy vehicle, such as a bus or a truck.

DETAILED DESCRIPTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In accordance with the present disclosure, a method for performing a gearshift in a powertrain of a vehicle when the powertrain is operated in creep mode is provided. The vehicle powertrain comprises a combustion engine, a gearbox, and a clutch arranged between the combustion engine and the gearbox. During creep mode, the vehicle powertrain is operated such that the vehicle travels at an essentially constant speed at engine idle speed without the driver operating an accelerator or a brake. The vehicle speed during creep mode is dependent of the gear engaged. Creep mode may alternatively be referred to as crawler mode or idle-driving mode. When a vehicle is operated in creep mode, a driver of the vehicle may change the vehicle speed by either exiting creep mode or by performing a gearshift. The present disclosure thus relates to a situation where the speed of the vehicle is to be altered, during creep mode, by means of shifting gear.

The method for performing a gearshift in a powertrain of a vehicle during creep mode comprises a step of, in response to a request for gearshift, disconnecting the combustion engine from the gearbox by opening the clutch. The request for gearshift may typically be a driver-initiated request for a gearshift, but is not limited thereto. When the opening of the clutch is initiated, the combustion engine may be operated at engine idle speed. Opening of the clutch enables the gearbox to be shifted from a current gear to a new gear.

The method further comprises a step of, when the combustion engine is disconnected from the gearbox, shifting the gearbox. Said shifting may comprise disengaging a current gear and engaging a new gear (the requested new gear). Furthermore, when the gearbox is disconnected from the combustion engine, the speed of the combustion engine is controlled to a target speed. Said target speed constitutes a combustion engine speed corresponding to a desired combustion engine torque for completing the torque ramp during closing of the clutch. In other words, the target speed constitutes a combustion engine speed corresponding to a desired combustion engine torque for initiating a closing of the clutch. The desired combustion engine torque for completing the torque ramp ensures that the gearshift will be comfortable to a driver or any other person on-board the vehicle. It should here be noted that said target speed of the combustion engine is not related to rotational speeds of transmission shafts in the gearbox for engaging the new gear. Furthermore, the target speed may, depending on the circumstances, be lower or higher than the idle speed of the combustion engine. For example, in case the vehicle is travelling in a slope, the target speed may typically be higher than the idle speed. However, in case the vehicle is travelling on a flat surface or in a decent, the target speed may be lower than the idle speed. Naturally, in some rare situations, the target speed may coincide with the idle speed of the engine. However, the target speed should not be lower than the minimum threshold speed of the combustion engine at which it may not be safely operated or be difficult to control.

The method further comprises a step of connecting the combustion engine to the gearbox by closing the clutch. This step may be performed when the new gear has been engaged, i.e. when the gearbox has been shifted, and the combustion engine has been controlled to the above mentioned target speed. During closing of the clutch, the torque transmitted from the combustion engine to the gearbox is ramped up by the slippage of the clutch until the clutch reaches a fully closed state. When the clutch has been fully closed, the combustion engine may be allowed to return to idle speed as given by the creep mode. The vehicle will thereby be travelling at a vehicle speed, different from the vehicle speed at the initiation of the method, while still being in creep mode.

The present method reduces the risk of wear of the clutch since the combustion engine is controlled to the above mentioned target speed before initiation of the closing of the clutch, and said target speed is dependent of the torque for completing the torque ramp in order to arrive at a desired new vehicle speed. In particular, the method opens for the possibility to, in many situations, reduce the rotational speed of the combustion engine to a speed lower than the idle speed before initiation of the closing of the clutch. This in turn enables faster closing of the clutch, and thereby reduces the clutch wear and results in more comfortable gearshifts.

The step of connecting the combustion engine to the gearbox may be performed in response to a determination that the combustion engine has reached the target speed. In case the combustion engine has reached the target speed before the shift has been completed in the gearbox, the step of connecting the combustion engine to the gearbox may be performed in response to a determination that the gearbox has been shifted. Alternatively, the step of connecting the combustion engine to the gearbox may be performed at a point in time at which it is expected that the combustion engine has reached the target speed and the gearbox has been shifted.

As mentioned above, the combustion engine is controlled to a target speed when the combustion engine is disconnected from the gearbox. Said target speed constitutes a combustion engine speed corresponding to a desired combustion engine torque for completing the torque ramp during the closing of the clutch. Said desired combustion engine torque for completing the torque ramp during closing of the clutch may constitute the actually needed combustion engine torque for completing the torque ramp, i.e. the combustion engine torque required for completing the torque ramp. However, an offset in torque may advantageously be added to said needed combustion engine torque in order to provide some margin in the control of the rotational speed of the combustion engine. Thereby, the risk of the combustion engine stalling, due to the load during the closing of the clutch, as a result of conditions to which the vehicle is exposed being altered (such as the road gradient) is significantly reduced. The torque offset may for example be within the interval of from 50 Nm to 300 Nm, including the end values. Preferably, the torque offset may be within the interval of from 100 Nm to 250 Nm, including the end values. The torque offset may, if desired, be varied depending on for example the road gradient and/or road conditions (providing different rolling resistance). If so, the torque offset may be derived from a look-up table stored in a control unit of the vehicle or at a remote control center, said look-up table specifying different torque offsets depending on conditions to which the vehicle is or may be exposed.

The desired as well as the required combustion engine torque for completing the torque ramp during closing of the clutch may be determined in accordance with any previously known method therefore. The torque required for completing the torque ramp may be dependent on factors such as road gradient, vehicle configuration, vehicle load etc. The desired combustion engine torque for completing the torque ramp during closing of the clutch may preferably be derived from a calculated required combustion engine torque for completing said torque ramp, but may alternatively be derived from historical data relating to previous gear shifts.

The method may comprise a step of determining the combustion engine speed corresponding to said desired combustion engine torque on the basis of a maximum torque curve defining the physical constraints of the combustion engine. By simply looking at the speed of the combustion engine corresponding to the desired combustion engine torque for completing the torque ramp during closing of the clutch, the target speed may be determined. However, should the speed of the combustion engine corresponding to the desired combustion engine torque be lower than the minimum threshold combustion engine speed with may be permitted for the combustion engine, the target speed may be set to said minimum threshold combustion engine speed.

The performance of the method for performing a gearshift in a powertrain of a vehicle during creep mode as described herein may be governed by programmed instructions. These programmed instructions typically take the form of a computer program which, when executed in or by a control device, cause the control device to effect desired forms of control action. Such instructions may typically be stored on a computer-readable medium.

Furthermore, the present disclosure provides a control device configured to perform a gearshift in a powertrain of a vehicle during creep mode in accordance with the method described herein. The control device may be configured to perform any one of the above described steps of the method. More specifically, the control device is configured to, in response to a request for gearshift disconnect the combustion engine from the gearbox by opening the clutch. The control device is also configured to, when the combustion engine is disconnected from the gearbox, shift the gearbox and control the speed of the combustion engine to a target speed. Said target speed constitutes a combustion engine speed corresponding to a desired combustion engine torque for completing a torque ramp during closing of the clutch, and is equal to or greater than a minimum threshold combustion engine speed. The control device is further configured to connect the combustion engine to the gearbox by closing the clutch. The control device may for example be configured to connect the combustion engine to the gearbox in response to a determination that the combustion engine has reach the target speed and the gearbox has been shifted to the new gear.

The control device may comprise one or more control units. The responsibility for a specific function or control may be divided between two or more of the control units. One or more of the control units may be implemented in the form of a computer. The control device may be a control device of a vehicle powertrain. The control device may be present in a vehicle. Alternatively, parts of the control device may be arranged remote from the vehicle, such as at a remote control center, if desired.

The present disclosure further relates to a vehicle comprising the above described control device. The vehicle may comprise a vehicle powertrain comprising at least one propulsion unit, such as a combustion engine, a gearbox and a clutch configured to connect and disconnect the propulsion unit from the gearbox. The vehicle may be a land-based heavy vehicle, such as a truck or a bus.

Figure 1:
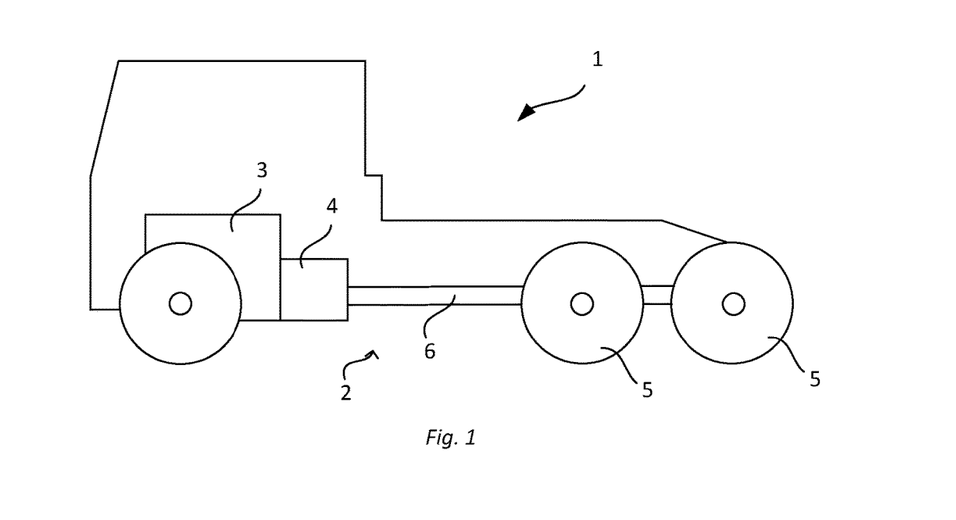
FIG. 1 schematically illustrates a side view of one example of a vehicle.

FIG. 1 schematically illustrates a side view of an example of a vehicle 1. The vehicle 1 comprises a powertrain 2 comprising a combustion engine 3 and a gearbox 4. A clutch (see FIG. 2) may be arranged between the combustion engine 3 and the gearbox 4. The gearbox 4 may be connected to the driving wheels 5 of the vehicle 1 via an output shaft 6 of the gearbox 4. The vehicle may be a heavy vehicle, such as a truck or a bus. The vehicle 1 may be a hybrid vehicle in which case the vehicle further comprises an electric machine.

Figure 2:
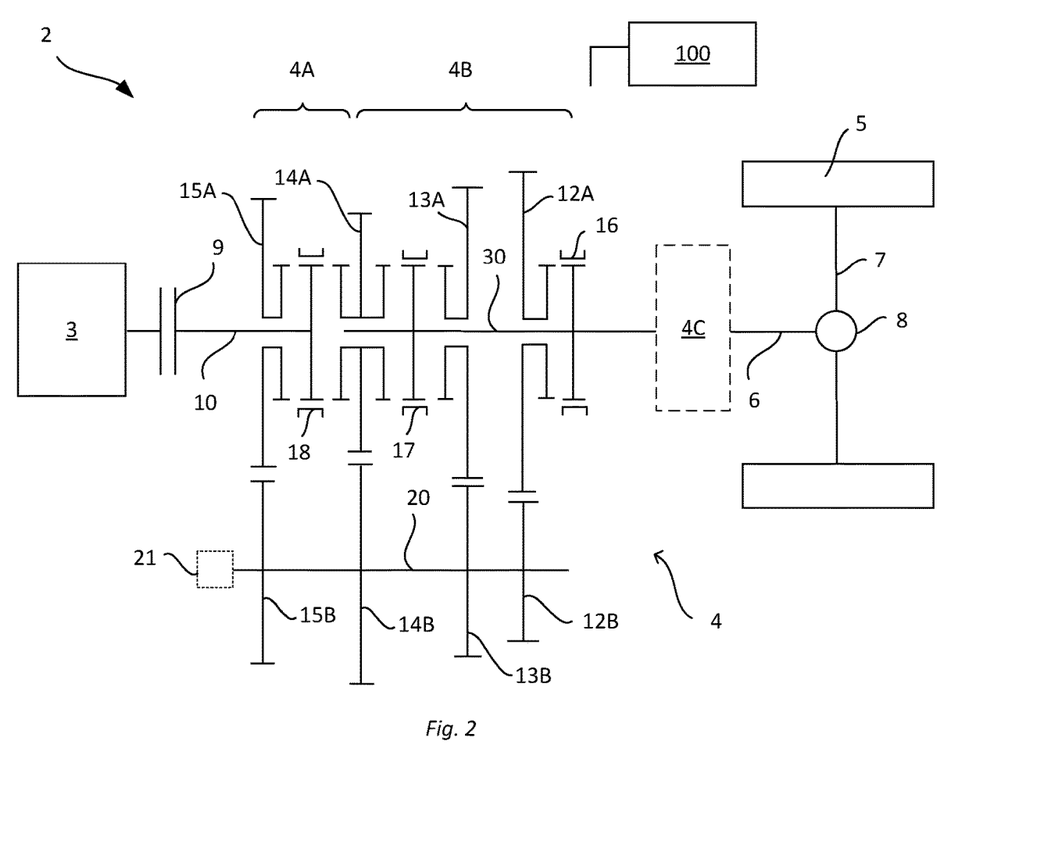
FIG. 2 schematically illustrates one exemplifying embodiment of a vehicle powertrain.

FIG. 2 schematically illustrates one exemplifying embodiment of a vehicle powertrain 2, such as a powertrain of the vehicle 1 shown in FIG. 1. The method for performing a gearshift during creep mode, as described herein, may be performed in the vehicle powertrain 2 shown in FIG. 2. The powertrain 2 comprises a combustion engine 3. The powertrain 2 further comprises a gearbox 4 and a clutch 9 arranged between the combustion engine 3 and the gearbox 4. The gearbox 4 may comprise an automated manual gearbox (AMT). The clutch 9 may for example be a friction clutch. The vehicle powertrain 2 furthermore comprises a control device 100, as will be described in more detail below. The control device 100 is configured to control at least a part of the powertrain 2.

The gearbox 4 comprises an input shaft 10 connected to the clutch 9 and an output shaft 6 connected to the driving wheels 5 via a differential 8 and a drive wheel shaft 7. The gearbox 4 comprises a first gearbox unit 4A and a second gearbox unit 4B arranged downstream of the first gearbox unit 4A. The first gearbox unit 4A may be a split gearbox unit. The second gearbox unit 4B may constitute a conventional main gearbox that can be set to a number of different forward gear ratios. The second gearbox unit 4B is connectable to the first gearbox unit 4A. Furthermore, the gearbox 4 may optionally comprise additional gearbox units as known in the art, for example a range gearbox unit 4C arranged downstream of the second gearbox unit 4B as shown in the figure.

The second gearbox unit 4B comprises a lay shaft 20. The layshaft 20 comprises a plurality of gear wheels 12B, 13B, 14B which are rotatably fixed to the lay shaft 20. For example, gear wheel 12B may represent a first gear, gear wheel 13B may represent a second gear, and gear wheel 14B may represent a third gear. The second gearbox unit 4B also comprises a main shaft 30. The main shaft 30 comprises a plurality of gear wheels 12A, 13A, 14A arranged to rotate freely in relation to the main shaft 30, but which may be selectively locked for rotation with the main shaft 30 in order to engage a gear. When each of the gear wheels 12A, 13A, 14A rotate freely in relation to the main shaft 30, the second gearbox unit 4B is in neutral. Thereby, no torque is transmitted from the combustion engine 3 to the driving wheels 5. The gear wheels 12A, 13A, 14A may each be locked to the main shaft 30 by means of corresponding coupling sleeves 16, 17. For example, the first gear in the second gearbox 4B can be engaged by maneuvering the first sleeve 16, arranged to rotate with the main shaft 30, to a position where the gear wheel 12A is engaged, i.e. to the left in the figure. The gear wheel 12A will thereby rotate with the main shaft 30, and the lay shaft 20 will thereby be connected to the main shaft 30 via gear wheel 12B. Each pair of gear wheels on the lay shaft 20 and main shaft 30 represents a gear ratio. The second gear in the second gearbox unit 4B may be engaged by disengaging the first sleeve 16 from the gear wheel 12A and instead moving a second sleeve 17 to a position to the right in the figure where, instead, gear wheel 13A is engaged. The gear wheel 13A is thereby brought into rotation with the main shaft 30. Correspondingly, the third gear in the second gearbox unit 4B may be engaged by maneuvering the second sleeve 17 to the left in the figure where, instead, gear wheel 14A is engaged. Each of the first through third gears in the second gearbox unit 4B is used for a plurality of the total number of gears provided by the gearbox 4 as a whole. The second gearbox unit 4B may further comprise one or more reverse gears (not shown) and a crawler gear (not shown).

The lay shaft 20 further comprises an additional gear wheel 15B that, similar to the above, is rotatably fixed to the lay shaft 20. The first gearbox unit 4A comprises a corresponding gear wheel 15A rotating freely in relation to the input shaft 10, but which may be selectively locked for rotation with the input shaft 10 through a split sleeve 18. When the split sleeve 18 locks the gear wheel 15A with the input shaft 10, torque can be transferred to the lay shaft 20 via the corresponding gear wheel 15B on the lay shaft 20. The split sleeve 18 can further be used to connect the input shaft 10 to the gear wheel 14A of the second gearbox unit 4B directly. This way, depending on whether the gear wheel 14A on the main shaft 30 is rotating freely in relation to the main shaft 30 or if it is locked on the main shaft 30, torque can be transferred to the lay shaft 20 via the corresponding gear wheel 14B on the lay shaft 20 or torque can be transferred from the input shaft 10 directly to the main shaft 30. The gear wheel pair 15A/15B and the split sleeve 18 can thereby be used to provide two different split gear ratios for each gear of the second gearbox unit 4B. The first gearbox unit 4A may thus be controlled to engage a high-split gear or a low-split gear. For example, engaging the low-split gear may comprise to connect the input shaft 10 with the low gear wheel 14A on the main shaft 30 by means of the split sleeve 18. When e.g. the first gear is engaged in the second gearbox unit 4B, the split sleeve 18 may be arranged to engage gear wheel 14A. This way, the input shaft 10 is directly connected to gear wheel 14B, which via gear 14B establishes a first gear ratio between the input shaft 10 and the lay shaft 20. The gear wheel 14A, however, is not locked to the main shaft 20, but the lay shaft 20 may be connected to the main shaft 20 through gear wheel pair 12A/12B. To engage the second gear, gear wheel pair 15A/15B is instead engaged, resulting in a second gear ratio between the input shaft and the lay shaft 20. The gear wheel 12A is still engaged by the coupling sleeve 16 according to the above, thereby extending the range of each gear. This split can be performed for each gear of the second gearbox unit 4B.

Each of the coupling sleeves 16, 17, 18 described above may for example be operated by pneumatic actuators (not shown). Furthermore, the clutch 9 may be operated by a pneumatic actuator (not shown).

The gearbox may also comprise one or more additional transmission brakes. For example, the gearbox may comprise a lay shaft transmission brake 21 configured to control the rotational speed of the lay shaft 20. The purpose of such a transmission brake may be to control a rotational speed of one or more of the shafts of the gearbox when performing gearshifts.

As mentioned above, the vehicle powertrain 2 further comprises a control device 100. The control device 100 may be configured to control one or more of the constituent components of the vehicle powertrain 2. For example, the control device may be configured to control the gearbox 4, the clutch 9 and the combustion engine 3.

It should be noted that although FIG. 2 illustrates a specific configuration of the gearbox of the vehicle powertrain, the present disclosure is not limited to said configuration. The method for performing a gearshift in a powertrain of a vehicle during creep mode as described herein may be performed irrespectively of the specific configuration of the gearbox, as long as the gearbox may be set to a plurality of forward gear ratios.

Figure 3:
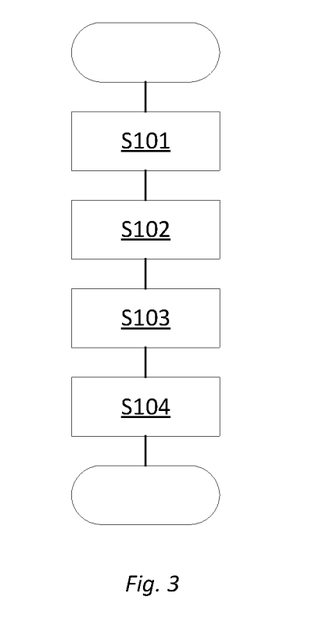
FIG. 3 represents a flowchart schematically illustrating one exemplifying embodiment of the method for performing a gearshift in a powertrain of a vehicle during creep mode in accordance with the present disclosure, FIG. 4 schematically illustrates an example of a maximum torque curve of a combustion engine, and FIG. 5 schematically illustrates a device that may constitute, comprise or be a part of a control device configured to perform a gearshift in a powertrain of a vehicle during creep mode.

FIG. 3 represents a flowchart schematically illustrating one exemplifying embodiment of the method for performing a gearshift in a powertrain of a vehicle during creep mode in accordance with the present disclosure. The method comprises a step S101 of, in response to a request for gearshift (when the powertrain is operated in creep mode), disconnecting the combustion engine from the gearbox by opening the clutch. When step S101 is performed, the combustion engine may be operated at idle speed. The method further comprises a step S102 of, when the combustion engine is disconnected from the gearbox, shifting the gearbox from the current gear to a new gear. The method further comprises a step S103 of, when the combustion engine is disconnected from the gearbox, controlling the speed of the combustion engine to a target speed. Said target speed constitutes a combustion engine speed corresponding to a desired combustion engine torque for completing the torque ramp during (the upcoming) closing of the clutch, and is equal to or greater than a minimum threshold combustion engine speed. The method further comprises a step S104 of, when steps S102 and S103 have been completed, connecting the combustion engine to the gearbox by closing of the clutch. Thereby, the creep mode can be continued at a different vehicle speed than the vehicle speed at the time of the request for gearshift.

As mentioned above, the speed of the combustion engine is controlled to a target speed when the combustion engine is disconnected from the gearbox. The target speed constitutes a combustion engine speed corresponding to a desired combustion engine torque for completing the torque ramp during closing of the clutch. The combustion engine speed corresponding to the desired combustion engine torque may be derived from a torque curve of the combustion engine.

Figure 4:
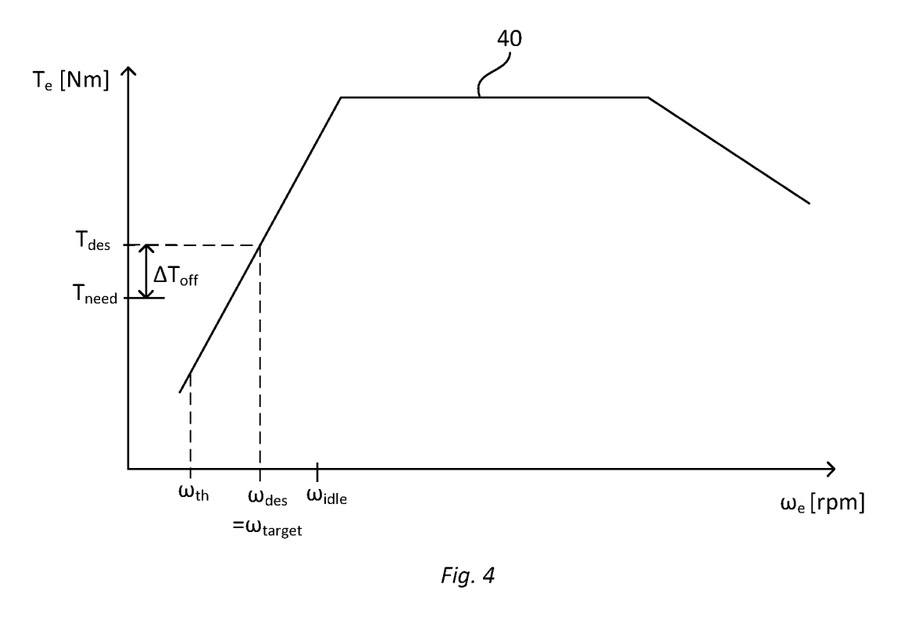

FIG. 4 schematically illustrates an example of a maximum torque curve 40 of a combustion engine. Such a maximum torque curve 40 defines the physical constraints of the combustion engine. Based on the desired combustion engine torque $T_{des}$ for completing the torque ramp during closing of the clutch, the corresponding combustion engine speed $\omega_{des}$ may be directly derived from the torque curve. This corresponding combustion engine speed $\omega_{des}$ may thus be set to constitute the target speed $\omega_{target}$ as long as it is equal to a higher than a minimum threshold combustion engine speed $\omega_{th}$. Should the corresponding combustion engine speed $\omega_{des}$ be less than the minimum threshold speed, the target speed $\omega_{target}$ may be set to said minimum threshold speed $\omega_{th}$. The target engine speed $\omega_{target}$ may, depending on the circumstances such as slope of the road, be lower than the idle speed $\omega_{idle}$ of the combustion engine.

The desired combustion engine torque may for example constitute required combustion engine torque $T_{need}$ for completing the torque ramp during closing of the clutch plus a predetermined torque offset $\Delta T_{off}$ intended to increase the control margin for the control of the speed of the combustion engine. In other words, $T_{des}=T_{need}+\Delta T_{off}$.

Figure 5:
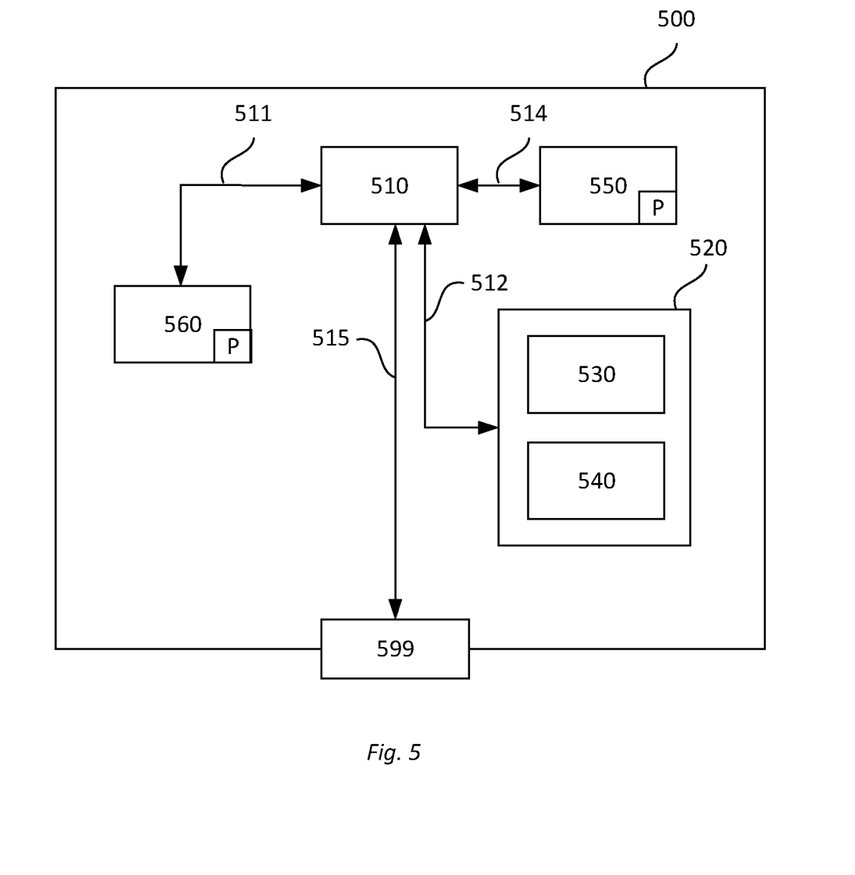

FIG. 5 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for performing a gearshift in a powertrain of a vehicle during creep mode. Said powertrain comprises a combustion engine, a gearbox and a clutch arranged between the combustion engine and the gearbox. The computer program comprises instructions for, in response to a request for gearshift, disconnecting the combustion engine from the gearbox by opening the clutch. The computer program further comprises instructions for, when the combustion engine is disconnected from the gearbox, shifting the gearbox and controlling the speed of the combustion engine to a target speed. Said target speed constitutes a combustion engine speed corresponding to a desired combustion engine torque for completing a torque ramp during closing of the clutch and is equal to or greater than a minimum threshold combustion engine speed. The computer program further comprises instructions for connecting the combustion engine to the gearbox by closing the clutch.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method, performed by a control device, for performing a gearshift in a powertrain of a vehicle during creep mode,
the powertrain comprising:
a combustion engine,
a gearbox, and
a clutch arranged between the combustion engine and the gearbox,
the method comprising:
in response to a request for gearshift, disconnecting the combustion engine from the gearbox by opening the clutch;
when the combustion engine is disconnected from the gearbox, shifting the gearbox and controlling a speed of the combustion engine to a target speed, said target speed constituting a combustion engine speed corresponding to a desired combustion engine torque for completing a torque ramp during closing of the clutch and being equal to or greater than a minimum threshold combustion engine speed; and
connecting the combustion engine to the gearbox by closing the clutch.

2. The method according to claim 1, wherein said desired combustion engine torque comprises a combustion engine torque required for completing the torque ramp during closing of the clutch plus a predetermined torque offset.

3. The method according to claim 2, wherein the predetermined torque offset is from 50 Nm to 300 Nm.

4. The method according to claim 1, further comprising:
determining the combustion engine speed corresponding to said desired combustion engine torque from a maximum torque curve defining physical constraints of the combustion engine.

5. The method according to claim 1, further comprising:
determining a first speed of the combustion engine corresponding to said desired combustion engine torque; and
if said first speed is below the minimum threshold combustion engine speed, setting the target speed to said minimum threshold combustion engine speed.

6. The method according to claim 1, wherein the request for gearshift constitutes a driver-initiated request for gearshift.

7. A computer program product comprising computer program code stored on a non-transitory computer-readable medium, said computer program code configured for performing a gearshift in a powertrain of a vehicle during creep mode, the powertrain comprising: a combustion engine, a gearbox, and a clutch arranged between the combustion engine and the gearbox, said computer program code comprising computer instructions to cause at least one control device to perform the following operations:
in response to a request for gearshift, disconnecting the combustion engine from the gearbox by opening the clutch;
when the combustion engine is disconnected from the gearbox, shifting the gearbox and controlling a speed of the combustion engine to a target speed, said target speed constituting a combustion engine speed corresponding to a desired combustion engine torque for completing a torque ramp during closing of the clutch and being equal to or greater than a minimum threshold combustion engine speed; and
connecting the combustion engine to the gearbox by closing the clutch.

8. A control device configured to perform a gearshift in a powertrain of a vehicle during creep mode, the powertrain comprising:
a combustion engine,
a gearbox, and
a clutch arranged between the combustion engine and the gearbox,
wherein the control device is configured to perform the operations of:
in response to a request for gearshift, disconnect the combustion engine from the gearbox by opening the clutch;
when the combustion engine is disconnected from the gearbox, shift the gearbox and control a speed of the combustion engine to a target speed, said target speed constituting a combustion engine speed corresponding to a desired combustion engine torque for completing a torque ramp during closing of the clutch and being equal to or greater than a minimum threshold combustion engine speed; and
connect the combustion engine to the gearbox by closing the clutch.

9. The control device according to claim 8, wherein said desired combustion engine torque comprises a combustion engine torque required for completing the torque ramp during closing of the clutch plus a predetermined torque offset.

10. The control device according to claim 9, wherein the predetermined torque offset is from 50 Nm to 300 Nm.

11. The control device according to claim 8, further configured to determine the combustion engine speed corresponding to said desired combustion engine torque from a maximum torque curve defining physical constraints of the combustion engine.

12. The control device according to claim 8, further configured to:
determine a first speed of the combustion engine corresponding to said desired combustion engine torque; and
if said first speed is below the minimum threshold combustion engine speed, set the target speed to said minimum threshold combustion engine speed.

13. The control device according to claim 8, wherein the request for gearshift constitutes a driver-initiated request for gearshift.

14. The control device according to claim 8, wherein said control device operates computer program code stored on a non-transitory computer-readable medium, said computer program code configured to cause said control device to perform the operations of claim 9.

15. A vehicle comprising:
a powertrain comprising: a combustion engine, a gearbox, and a clutch arranged between the combustion engine and the gearbox; and
a control device configured for performing a gearshift in a powertrain of a vehicle during creep mode by performing the operations of:
in response to a request for gearshift, disconnect the combustion engine from the gearbox by opening the clutch;
when the combustion engine is disconnected from the gearbox, shift the gearbox and control a speed of the combustion engine to a target speed, said target speed constituting a combustion engine speed corresponding to a desired combustion engine torque for completing a torque ramp during closing of the clutch and being equal to or greater than a minimum threshold combustion engine speed; and connect the combustion engine to the gearbox by closing the clutch.

16. The vehicle according to claim 15, wherein said control device operates computer program code stored on a non-transitory computer-readable medium, said computer program code configured to cause said control device to perform the operations of claim 15.

* * * * *